INVENTOR.
NORMAN F. PARKER
BY
William R. Lane
ATTORNEY

Nov. 1, 1966 N. F. PARKER 3,282,118
ALTERNATE DRIVE SYSTEM OF REVERSING GYROSCOPES
ON A STABLE PLATFORM
Filed Sept. 2, 1955 4 Sheets-Sheet 2

INVENTOR.
NORMAN F. PARKER
BY William L. Lenn
ATTORNEY

*INVENTOR.*
NORMAN F. PARKER
BY
*William R. Lane*
ATTORNEY

United States Patent Office 3,282,118
Patented Nov. 1, 1966

3,282,118
ALTERNATE DRIVE SYSTEM OF REVERSING
GYROSCOPES ON A STABLE PLATFORM
Norman F. Parker, Whittier, Calif., assignor to
North American Aviation, Inc.
Filed Sept. 2, 1955, Ser. No. 532,147
13 Claims. (Cl. 74—5.34)

This invention relates to autonavigators and more particularly that portion of an autonavigator termed the "stable platform" which utilizes gyroscopes to maintain acceleration measuring devices in a given orientation so that navigation can be accomplished. More particularly, it pertains to a drive system for gyroscopes which are alternately reversed in their direction of rotation.

The stable platform of an autonavigator provides a mounting reference for the accelerometers. By reason of the fact that the stable platform maintains its original orientation or maintains a particular rotation with respect to its earthly location, the accelerometers are held to measure along a particular axis and in this way navigation is accomplished. In general, stable platforms are required to undergo rotation in inertial space in order to maintain their prescribed relationship with reference to the earth. For example, if the stable platform maintains itself locally level with respect to the earth, it necessarily experiences a certain amount of rotation in inertial space because the earth rotates. Inasmuch as gyroscopes are sensitive to rotation in space, it is necessary that they be properly precessed by torques applied to them or there be some means of rotating the gyroscopes relative to the platform. Generally speaking, devices which apply torques to gyros are the weakest factor in establishing gyro performance and, consequently, precision torquers are avoided if possible. On the other hand, changing the orientation of the gyroscope relative to the stable platform implies a change with respect to gravity which has an adverse effect on gyro performance and should also be avoided if possible. These two conditions, avoiding precision torquers and maintaining constant orientation relative to gravity, are ordinarily incompatible. However, in systems which employ a larger number of gyroscopes than is absolutely necessary to stabilize the platform, it is possible to maintain gyro orientation relative to gravity without having to apply precision precession torques to the gyroscope. The device of the invention depends upon having a larger number of gyroscopes than is necessary to stabilize the platform and periodically reorienting relative to gravity those gyrscopes which are free. This method is particularly well suited to systems employing the principle of periodically reversing alternate gyroscopes of a pair.

Regardless of how perfectly a gyroscope is constructed, certain disturbing torques are bound to be present causing the platform of the gyroscopic system to drift. These disturbing torques which include varying lead-in torques and various unbalanced torques are, in part, dependent on the spin direction of the gyroscopes rotor. Reversing the rotor therefore removes a considerable amount of these disturbing torques. In application Serial No. 200,234, filed December 11, 1950, in the names of Darwin L. Freebairn and John M. Slater, entitled "Self-Compensating Gyro Apparatus" is disclosed the method of obtaining higher gyroscopic accuracy by periodically reversing the spin direction. According to that invention, each gyroscope of a pair capable of being reversed is used alternately to stabilize while the other is being reversed. While one gyroscope provides the reference element for the platform, the other gyroscope is returned to zero speed and brought up to speed again in the reverse direction. Passing through this point of zero speed, provides an opportunity to reorient the gyroscope relative to gravity with no adverse influence.

A principal object of this invention therefore is to provide a system of driving alternate gyros.

It is another object of this invention to provide a platform stabilized by periodically reversing gyroscopes which are periodically reoriented with respect to gravity.

It is still another object of this invention to provide a method of reorienting gyroscopes with respect to a stable platform.

It is still another object of this invention to provide a precision drive for orienting gyros.

Another object of this invention is to use a gyroscope as a reference to reorient another gyroscope.

It is still another object of this invention to provide a stable platform oriented by periodically reversing gyroscopes, said gyroscopes being reoriented during their free period.

It is a still further object of this invention to provide a method of reducing spurious torques upon a platform by alternately reversing the gyroscopes and resetting each gyroscope relative to the platform.

Other objects of invention will become apparent from the following description taken in connection with the accompanying drawings, in which.

Figure 7:
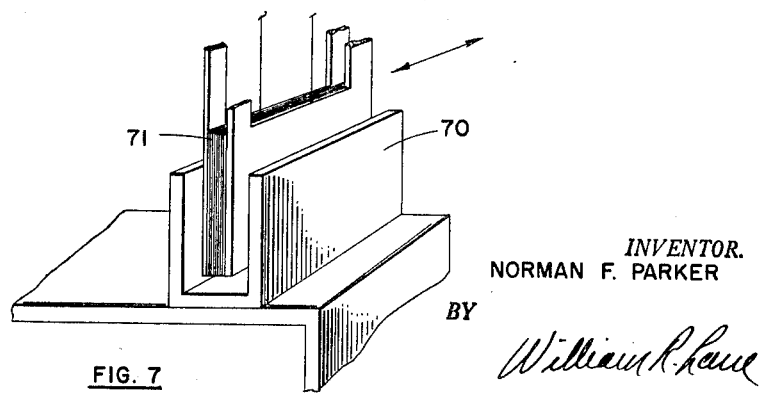

And FIG. 7 is an enlargement of the gyro torquer.

Figure 1:
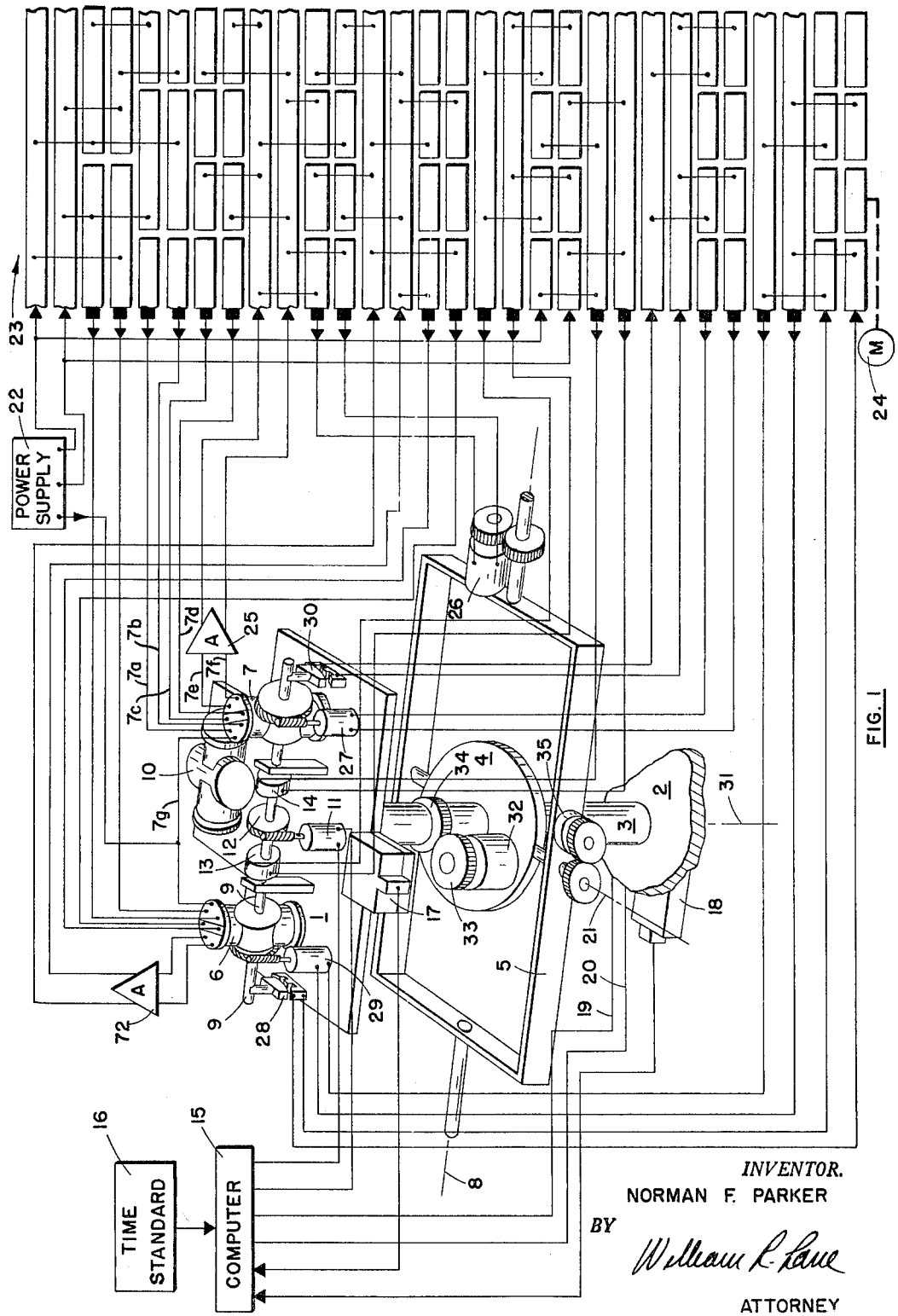
FIG. 1 is the rudimentary schematic diagram of a stabilized platform showing drum switching.

In FIG. 1, the stable platform is divided into correlated halves, or stable elements, 1 and 2, which are rigidly disposed at opposite ends of shaft 3 which rotates within gimbal plate 4 which, in turn, is adapted for rotation within gimbal 5. Paired gyros 6 and 7 are coaxially mounted so as to have a common input axis lying along shaft 9. A third gyro 10 is rigidly connected to stable element 1. Gyros 6 and 7 indicate any rotation, or angular velocity, about the axis of shaft 9 which gives the platform stabilization about axis 8. Precision gear drive motor 11 rotates gear 12 and one of gyros 6 and 7, depending on which clutch, 13 or 14, is energized, in accordance with the rotation the platform should experience while traveling around the earth or with the passage of time. The gyro, while stabilizing the platform, thus maintains its original orientation in space while the platform rotates to remain level with the earth at its current location. Motor 11 drives in accordance with signals received from computer 15. Computer 15 provides signals to motor 11 in accordance with the signals received from time standard 16 and accelerometer 17 and accelerometer 18 so as to maintain platform element 1 locally level. Using similar gyroscopes, gear drives and etc., mounted on stable element 2, a motor comparable to that of motor 11 receives signals through lines 19 and 20 from computer 15. From these gyros, motor 35 receives signals to stabilize elements 1 and 2 about an axis 21.

Each gyro is a three-phase motor caused to rotate by reason of three-phase power supply 22 whose connections to the gyros are completed through the switching arrangement of drum 23. It will be noticed that as the drum rotates, the phases are reversed to cause gyroscopes 6 and 7 to reverse their direction of spin. Motor 24 drives drum switch 23 at a given rate. Each gyro detects any incipient rotation about the axis of shaft 9. If gyro 7 is in control of the stabilization of element 1, and any incipient rotation occurs about the input axis, a signal is presented to amplifier 25, which, by reason of the connections on drum 23, is connected to torquer motor 26 to cause gimbal 5 to rotate and remove the incipient rotation. This incipient rotation may be otherwise expressed as torque. Stable element 1 therefore becomes stabilized about the axis 8.

Gyroscopes 6 and 7 through the switching provided by drum 23 alternately control torquer motor 26. If shaft 9 is not maintained substantially aligned with axis 8, the signal received by motor 26 must first be passed through a resolver mounted much the same as motor 32. The controlling gyro is connected through its respective clutch and shaft 9 to gear 12, motor 11 and platform 1. The clutches 13 and 14 are energized at proper intervals by drum switch 23, in accordance with whichever gyro is in control of the platform. Therefore, electromagnetic clutch 13 is arranged to be energized and provides drive between gyro 6 and gear 12 when the pick-off (not shown, but corresponding to pickoff 65, FIG. 5) of gyro 6 is providing control of stable element 1 by furnishing torquing signals to amplifier 72 and through drum switch 23 to torquer motor 26. Clutch 14 is electrically energized when gyro 7 is in control of the platform 1. During those instances in which clutch 13 is disengaged, gyroscope 6 is, according to the concept of this invention, desired to be rotated back to a null position with respect to stable platform 1. This is accomplished by a position indicating device shown as an E pick-off 28 which is connected to indicate when gyro 6 is in upright position with respect to platform 1. Pick-off 28 provides an output signal which, through drum 23, drives motor 29 to cause gyroscope 6 to return to a null position with respect to the platform 1 during the interval it is not controlling platform 1. A similar arrangement utilizing E type pick-off 30 and motor 27 drives gyroscope 7 to a null position with respect to the platform 1 during the interval gyroscope 7 is not controlling the platform 1. Drive motors 27 and 29 may or may not reversibly drive gyroscopes 6 and 7 depending on the desired capabilities of the navigational system with respect to changing and reversing its course, or with respect to speed. The worm gears attached to motors 27 and 29 are, themselves, reversible so as to allow freedom of motion of the gyroscopes 6 and 7 when driven by gear 12 and when driven to provide reorientation by motors 27 and 29 as explained previously In summary, it may be seen that one gyroscope maintains control of the stable platform about a given axis during the interval the second gyroscope is being reversed and brought to a null position with respect to the platform. Then the second gyro takes control of the platform and the rotor of the first gyro is reduced to zero speed, the casing of the gyroscope is nulled with respect to the platform and the rotor is brought up to speed in reverse direction. The platform of FIG. 1 is therefore, according to the connections shown, stabilized about an axis. 8. The controlling gyro, being connected to the platform through its respective clutch, provides signals to the torquer motor 26 to remove any undesired platform torques. The platform is held locally level after the passage of time or distance by rotation of shaft 9 by motor 11 and gear 12.

In order to provide stabilization about an axis 31 running through shaft 3, gyroscope 10 and its counterpart, which is mounted in a corresponding position on the underside of stable element 2, are adapted to be alternately reversed by drum switching arrangement such as is indicated for gyros 6 and 7 and the gyroscope which is in control is connected to torque motor 32 to remove any incipient rotation about axis 31. Motor 32 through gears 33 and 34 torques shaft 3 and causes stable elements 1 and 2 to rotate or removes spurious torques. Stabilization about axis 21 is obtained by a third pair of gyros mounted on stable element 2 in the same fashion as those mounted on stable element 1. Such gyros would be adapted with drum switching similar to that of drum 23 and would similarly achieve stabilization about axis 21. The counterpart of torquer 26 in stabilization about axis 21 would be torquer motor 35.

Figures 2, 3:
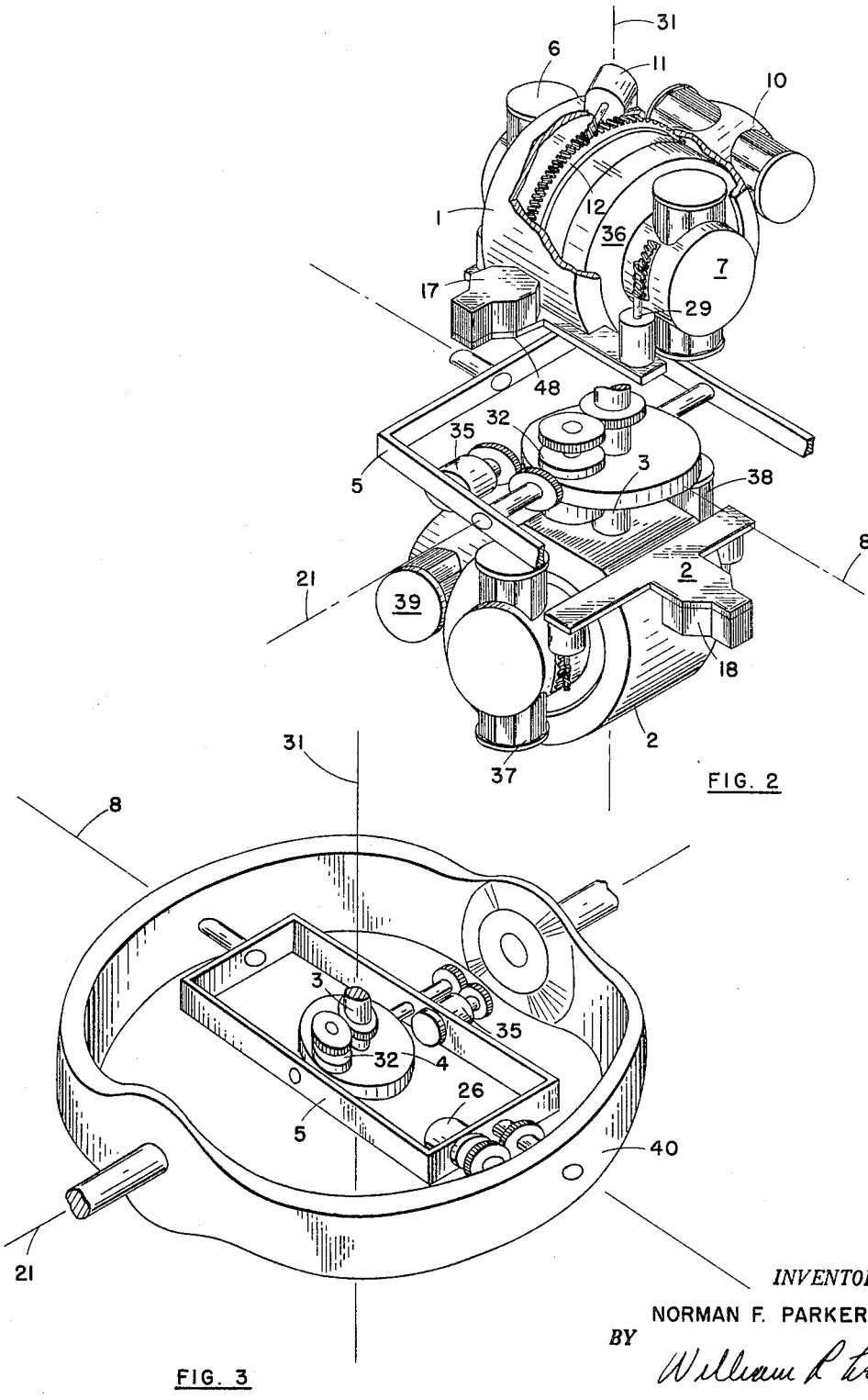
FIG. 2 is a perspective showing the correlative halves of the stable platform element.
FIG. 3 is a perspective of the gimbal mounting system of the stable platform.

A more compact construction of stable elements 1 and 2 interconnected by their shaft 3 (shown broken) is illustrated in FIG. 2. Gyroscopes 6 and 7 are closely mounted relative to each other and clutch plate 36 of clutch 14 is visible upon which gyroscope 7 is mounted. Gyroscopes 37 and 38 are mounted through respective clutches to stable element 2 and provide the signals to torquer 35 to stabilize the platform about axis 21. Gyroscopes 10 and 39 are rigidly connected to elements 1 and 2, respectively, and provide stabilization about an axis 31 by maintaining control of torquer motor 32 through a drum switching arrangement as illustrated in FIG. 1. These gyros are similarly reduced to zero speed, nulled with respect to the platform, and reversed in their direction of rotation.

FIG. 3 indicates one possible gimbal system, having an outer ring 40, which may be adapted to rotate about axis 21. A first gimbal 5 is adapted to rotate in ring 40 and be torqued with respect thereto by the torquer motor 26. The inner gimbal plate 4 is adapted to rotate with respect to gimbal 5 and be torqued with respect thereto by torquer motor 35. Shaft 3 is rotatably mounted in gimbal plate 4 and is adapted to be torqued about axis 31 with respect to gimbal plate 4 by torquer motor 32. Such a gimbal system provides complete freedom for the stable elements 1 and 2 so they can be maintained in desired orientation.

In accordance with the passage of time and distance, the computer in the device of FIG. 1 drives motor 11 which, in turn, rotates gear 12 and drives gyroscope 6 and 7, depending upon whether clutch 13 or 14 is energized. That is, while a particular gyroscope is maintaining control of the platform, the distance traveled over the earth and the passage of time are factors which must cause the gyroscope and the platform to rotate with respect to each other in order to maintain the gyroscope inertially in space and the platform locally level, as mentioned previously.

Computer 15 is required to compute the amount of rotation motor 11 should impart to gear 12 to maintain the platform 1 locally level about axis 8 for the period each gyro is in control. Likewise, computer 15 computes the rotation the corresponding motor and gear of platform 2 should experience to maintain the platform locally level about axis 21. The earth rotation is taken into account by a time standard which furnishes the computer with time information. Further computations such as compensation for the acceleration of Coriolis, earth's oblateness, deviation of gravity, and so on, may be superimposed upon the basic calculations made by this computer.

By means of the repeated nulling of the gyroscopes they are not required to tumble while spinning as the platform proceeds around the earth or as time passes. It may be understood that instead of providing gyroscopes 6 and 7 with two clutches and a single drive motor that alternate drive arrangements are possible such as providing each gyroscope with a separate motor driven by computer 15 alternately as each gyro takes control.

Figure 4:
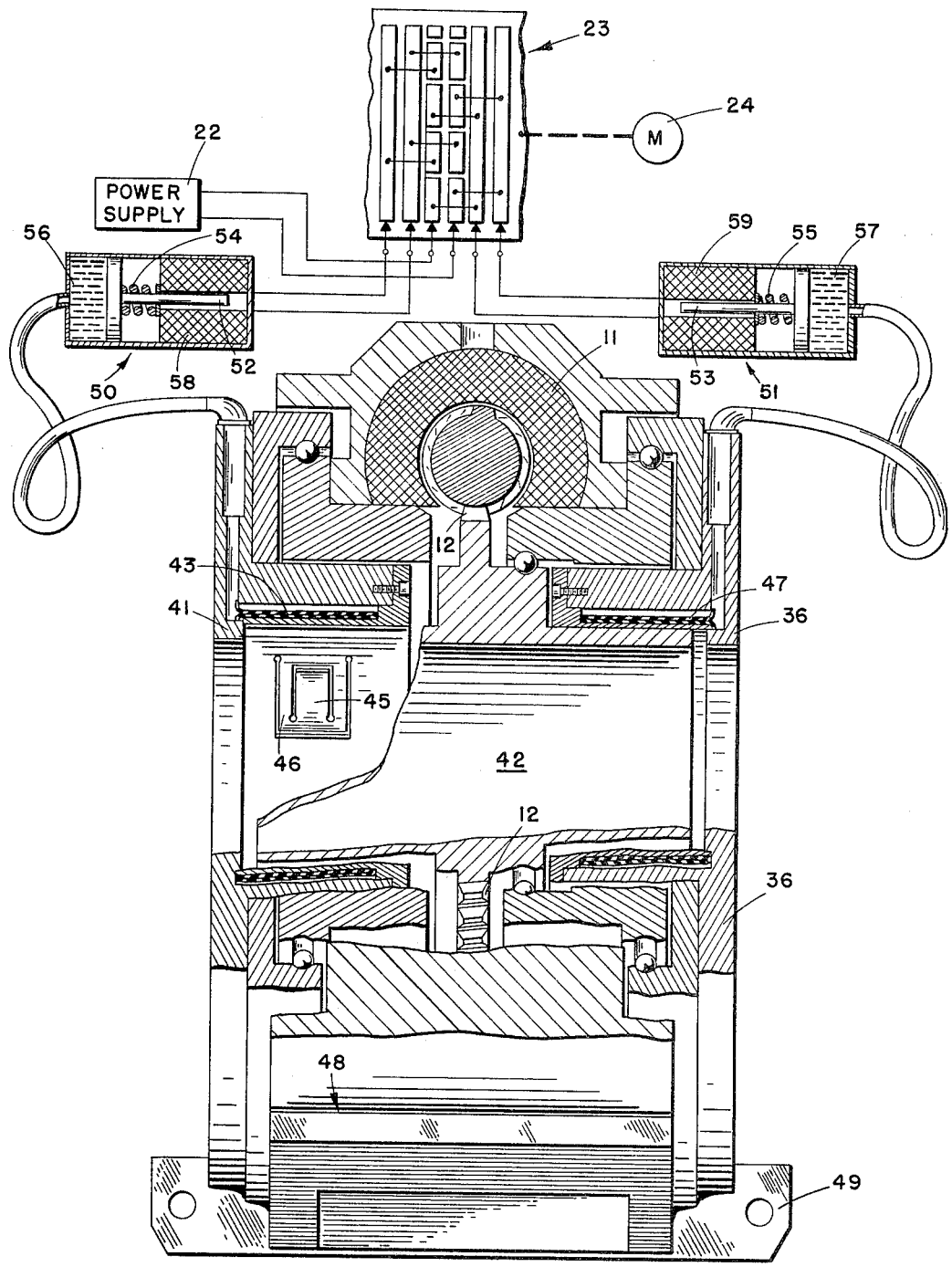
FIG. 4 is a perspective in partial cross-section showing a typical construction of one of the correlative halves of the stable platform, showing clutch and drive construction which rotates the gyroscopes.

FIG. 4 illustrates in perspective section stable element 1 which provides motor drive and clutching, illustrated by clutches 13 and 14, FIG. 1. Gyros 6 and 7 (not shown) are bolted to clutch plates 41 and 36, respectively. Clutch plate 42 acts to drive clutch plate 41 whenever rubberized innertube 43 is expanded by fluid pressure from electrically controlled solenoid pressure device 50. Whenever pressure is received by rubber tube 43, flexible metallic sections 45 and 46 of clutch plate 41 are expanded into positive engagement with clutch plate 42 which is driven by gear 12. At alternate intervals, rubberized innertube 47 may cause the flexible metallic elements of clutch plate 36 to expand into engagement with clutch plate 42 and drive gyro 7. This device is known as a "Sphincter" clutch. Motor 11 is illustrated as mounted above ring gear 12. Accelerometer 17 is mounted on shelf 48 and gyro 10 is firmly bolted to bracket 49. The clutches of this drive are electrically controlled by drum switch 23 as illustrated in FIG. 1. In FIG. 4, the electrical signal operates pressure devices 50 and 51 to pull solenoid plungers 52 and 53 so as to reduce the pressure caused by springs 54 and 55 on hydraulic fluid 56 and 57. When power supply 22 is connected through drum switch 23 to solenoid 59, plunger 53 is retracted and fluid 57 is released from pressure. Clutch plate 36 is, at that moment, out of engagement with clutch plate 42. At the same time, solenoid 58 is de-energized, and fluid 57 is under spring pressure, inflating innertube 43, causing clutch plate 41 to be driven by clutch plate 42.

Figure 5:
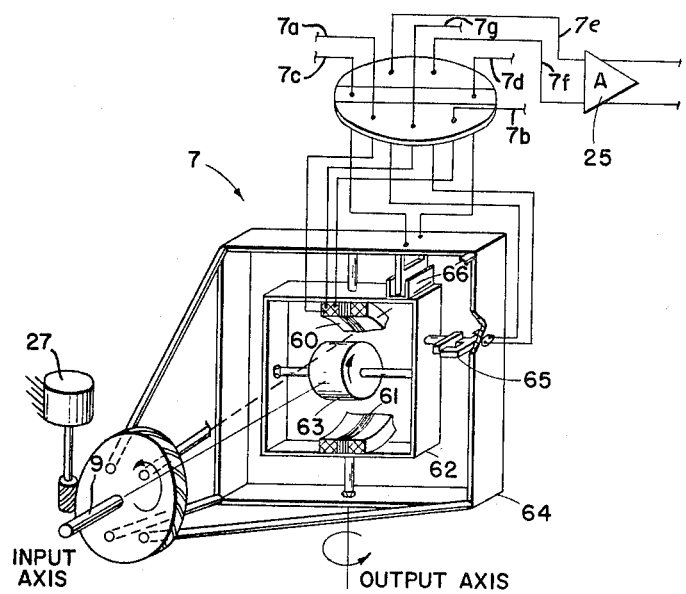
FIG. 5 is a rudimentary sketch of a gyroscope in clarification of the connections illustrated in FIG. 1.

FIG. 5, which is a rudimentary perspective of a gyroscope, illustrates the connections within the device. Motor coils 60 and 61 which cause the rotor to turn are illustrated. As each gyroscope is caused to rotate physically about the axis of shaft 9 (by its clutch being energized as explained previously), inner gimbal 62 would be caused by the precession of rotor 63 to pivot within outer case 64. During this period of rotation, or reorientation, by the clutch, it is desired that the gyroscope be "caged," or locked, so that no precession occurs. This is accomplished by pick-off 65 which detects any rotation of gimbal 62 relative to the case 64 and sends the signal to amplifier 25. By drum 23, FIG. 1, the signal is sent to torquer 66, FIG. 5, which electromagnetically "cages" gimbal 62.

Figure 6:
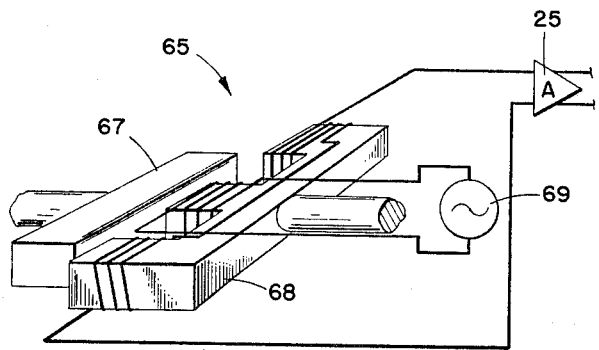
FIG. 6 is an enlargement of the gyro pick-off and associated circuit.

FIG. 6 more clearly illustrates pick-off 65. A soft iron member 67 is placed on gimbal 62 whose motion is to be detected and E-shaped magnetic core 68 is affixed to the case 64. The center pole of core 68 is excited by oscillator 69. The flux in the center pole is coupled more strongly into one outer pole or the other, depending on the exact displacement of member 67 in one direction or the other. This coupling provides a signal whose phase indicates direction of displacement and whose magnitude indicates amount of displacement. Amplifier 25 receives the signal, sends it to drum switch 23, FIG. 1, which returns the signal either to torquer 26, if the gyroscope is in control of the platform, or to torquer 66, FIG. 5, if the gyroscope is not in control and is being reoriented. Torquer 66, FIG. 7, is essentially a magnet member 70 and a coil 71 through which current is sent to cause an electromagnetic force to be developed as desired. Torque can thus be developed between gimbal 62 and case 64 according to pick-off 65, to "cage" the gyro.

The alternate drive device thus uses each gyroscope of a pair as a reference to reorient the other gyroscope after it has been reversed.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A stable reference having, in combination, a stable element mounted with at least one axis of freedom, one pair of gyroscopes attached to said stable element, said gyroscopes having their input axes substantially parallel to said axis of freedom so as to detect the orientation of said stable element about said axis of freedom and thereby provide a reference, means for reversing direction of spin of the rotors of said gyroscope alternately, means for controlling the orientation of said stable element about said one axis of freedom according to the reference provided by said gyroscopes alternately, means operable to provide re-orientation of each said gyroscope individually about an axis parallel to said one axis of freedom, with respect to said stable element, during intervals of control of said stable element by the other said gryoscope according to the reference provided by said other gyroscope.

2. In a stable reference having, in combination, a stable element mounted so as to be stabilized about at least one axis, a pair of gyroscopes having rotors adapted to be reversed in spin direction, said gyroscopes being attached to said stable element and having their input axes substantially parallel to said one axis, means for reversing the spin direction of the rotors of said gyroscopes at predetermined time intervals, means for controlling the orientation of said stable element about said axis according to the output provided by said gyroscopes alternately at predetermined time intervals, said gyroscopes being mounted so as to be rotatable about their input axes with respect to said stable element, means for rotating each said gyroscope about its input axis relative to said element, pickoff means for said gyroscopes disposed to indicate rotation of each said gyroscope about its input axis relative to said element, said means for rotating being operable in response to said pickoff means so as to re-orient a particular gyroscope during intervals of control by the other said gyroscope.

3. In a stable reference having, in combination, a stable orientable element mounted so as to be capable of being stabilized about a plurality of axes, a plurality of gyroscopes having rotors adapted to be reversed in a spin direction, said gyroscopes being mounted on said stable element and having their input axes substantially parallel with a respective axis of freedom of said stable element, at least one pair of said gyroscopes being pivotally mounted on said stable element, means for controlling the orientation of said stable element about said axes according to the output provided by alternate gyroscopes of a respective pair, drive means for rotating each said pivotally mounted gyroscope with respect to said element about the input axis of said gyroscope, pickoff means for each said driven gyroscope disposed to indicate rotation of each gyroscope about said input axis relative to said element, switch means operative to connect the signal from said pickoff means on at least one said gyroscopes to said drive means operable to drive said latter mentioned gryoscope about said input axis during the interval of control by the other gyroscope of the pair, whereby said gyroscopes are alternately re-oriented relative to said element, and means for caging each said gyroscope about its output axis during its interval of re-orientation.

4. In a stable reference having in combination a stable element, means providing said stable element with freedom of motion about at least one axis, first and second gyroscopic references each having a rotor and each mounted with respect to said stable element so as to sense any angular velocity about said axis, means for controlling the motion of said stable element about said one axis in accordance with the output provided by said gyroscopic references, switching means for alternating the control from one of said gyroscopic references to the other at predetermined time intervals, means for facilitating re-orientation of each gyroscopic reference about the input axis thereof, and means operable to provide re-orientation of each said gyroscopic reference of at least one pair about an axis parallel to said one axis with respect to said stable element and caging of its rotor during control by the other said gyroscopic reference of said pair.

5. In a stable reference having in combination a stable element, means providing said stable element with freedom of motion about three axes, a plurality of pairs of gyroscopic references each having a rotor, each pair of which is mounted so as to sense any angular velocity of said stable element about a respective axis, said stable element adapted for orientation about said three axes means for controlling the orientation of said stable element in accordance with the output provided by said gyroscopic references, switching means for at least one of said pair of gyroscopic references for alternating control of said stable element from one gyroscopic reference of a pair to the other at predetermined time intervals, means for facilitating re-orientation of each gyroscopic reference of one pair about the input axis thereof, and means operable to provide re-orientation of each gyroscopic reference of at least one pair about its own input axis with respect to said stable element and caging of its rotor during control by the other said gyroscopic reference of a pair.

6. In a stable reference having a combination, a stable element, means providing said stable element with freedom of motion about three axes, three pairs of gyroscopes each having a rotor, said pairs of gyroscopes mounted with respect to said stable element so as to sense any angular velocity about the axes of said stable element, means for controlling the motion of said stable element about said axes in accordance with the output provided by said gyroscopes, switching means for at least one said pair of gyroscopes for alternating control of said stable element from one gyroscope of a pair to the other, means operable to provide re-orientation of means for facilitating re-orientation of each gyroscope of one pair about its input axis, each said gyroscope of at least one pair of gyroscopes with respect to said stable element during control by the other gyroscope of the pair, and means operable to cage the rotor of each said gyroscope during its interval of re-orientation.

7. In a stable reference having in combination, a stable element, a gimbal system mounting said stable element and providing three degrees of freedom therefor, three pairs of gyroscopes each having a rotor, said pairs of gyroscopes mounted with respect to said stable element to sense any angular velocity of said stable element, means for controlling the angular motion of said stable element in accordance with the output provided by said gyroscopes, switching means for said three pairs of gyroscopes for alternating control of said stable element from one gyroscope of a pair to the other, said switching means operated according to a predetermined function of time, means for facilitating re-orientation of two pairs of gyroscopes about their respective input axes, and means for said two pairs of said gyroscopes for providing re-orientation of each said gyroscope of a pair about the input axis of said gyroscope with respect to the stable element and caging of its rotor during control by the other.

8. In a stable reference, in combination, a stable element, means for providing said element with angular freedom about at least one axis, means providing at least one pair of said gyroscopes with rotatable movement about an input axis parallel to said axis of freedom with respect to said stable element, the rotors of said gyroscopes adapted to be alternately reversed in spin direction, means for reversing the spin direction of the rotors of said gyroscope, means for controlling the angular motion of said stable element according to said gyroscopes alternately, first drive means operable to rotate each said gyroscope during its interval of control, second drive means operable to rotate each said gyroscope during at least a portion of its interval of reversal, and means operable to cage the rotor of each said gyroscope so as to restrain said rotor from rotating about the output axis of said gyroscope during said portion of said interval of reversal.

9. The combination recited in claim 8 wherein the input axes of the gyroscopes of said pair are parallel and wherein said means providing a rotatable movement provides movement of each said gyroscope about its input axis with respect to said stable element.

10. In a stable reference having in combination a stable element mounted with freedom of motion about at least one axis three pairs of gyroscopes, each said gyroscope of at least two pairs attached to said stable element and rotatably mounted with respect to said stable element and the rotors of said gyroscopes adapted to be alternately reversed in spin direction, means for reversing the direction of rotation of the rotors of said pairs of gyroscopes, means for controlling the motion of said stable element in accordance with the output provided by each said gyroscope of a pair during the interval the rotor of the other gyroscope of the pair is being reversed, first drive means operable to rotate each said rotatable gyroscope about its input axis relative to said stable element during intervals of control by said gyroscope, second drive means operable to rotate each said rotatable gyroscope about its input axis during at least a portion of its period of reversal, and means operable to cage the rotor of each said rotatably mounted gyroscope about the respective output axis of each said gyroscope during at least a portion of its interval of reversal.

11. In a stable reference having in combination, a stable element capable of being oriented about at least one axis at least one pair of gyroscopes, said gyroscopes of a pair having parallel input axes, each said gyroscope of at least one pair rotatably mounted about its respective input axis with respect to said stable element and having rotors adapted to be alternately reversed in spin direction, means for reversing the direction of spin of said rotors of said pairs of gyroscopes means for controlling the orientation of said stable element about said axis in accordance with the output provided by each said gyroscope of a pair during the interval the rotor of the other gyroscope of the pair is being reversed in spin direction, motor drive means operable to rotate each said rotatable gyroscope about its input axis relative to said stable element, clutch means operable to connect said motor drive means to each said rotatable gyroscope during the interval of control by said gyroscope and disconnect said motor drive means from each said gyroscope during the interval of reversal of spin direction of the rotor thereof, second drive means operable to rotate each said gyroscope during the interval of reversal of spin direction of the rotor thereof, and means operable to cage the rotor of each said rotatably mounted gyroscope about the output axis of said rotor gyroscope during its interval of re-orientation.

12. In a stable reference having in combination, a stable element mounted for stabilization about three mutually perpendicular axes three pair of gyroscopes, each of said gyroscopes having its input axis aligned parallel with one of said mutually perpendicular axes, said gyroscopes of a pair having parallel input axes, each said gyroscope of two pair rotatably mounted about its respective input axis with respect to said stable element and said gyroscopes having rotors adapted to be alternately reversed in spin direction, means for reversing the direction of spin of said rotors of said pairs of gyroscopes means for controlling the motion of said stable element in accordance with the output provided by each said gyroscope of a pair during the interval the rotor of the other gyroscope of a pair is being reversed, respective motor drive operable to rotate each pair of rotatable gyroscopes about its input axis relative to said stable element, clutch means operable to connect said motor drive means to each said rotatable gyroscope during the interval of control by said gyroscope and disconnect said motor drive means from each said gyroscope during the interval of reversal, respective pickoff means for each rotatable gyroscope indicating the position of said gyroscope about its input axis relative to said stable element, motor drive means responsive to the signal from said pickoff means of a respective gyroscope to rotate said latter-mentioned respective gyroscope relative to said stable element, and switch means synchronizing the reversal of the spin direction of the rotors of said gyroscopes, operation of said clutch means, and rotation of said gyroscopes.

13. In combination with an attitude reference system having a stable element and a pair of gyroscopes carried thereby for controlling orientation thereof, apparatus for causing each gyroscope to experience a net component of rotation substantially corresponding to earth rate, said apparatus comprising means for causing said gyroscopes to be released from control of the element orientation one at a time, means for causing each gyroscope to be maintained in a space fixed orientation while it is in control of the element, means for facilitating reorientation of each gyroscope relative to the element and means for angularly shifting each gyroscope relative to the element while such gyroscope is released from control.

References Cited by the Examiner

UNITED STATES PATENTS

| | | | |
|---|---|---|---|
| 2,414,291 | 1/1947 | Evans | 33—204 |
| 2,591,697 | 4/1952 | Hays. | |
| 2,729,108 | 1/1956 | Vacquier. | |
| 2,835,131 | 5/1958 | Vacquier. | |

FOREIGN PATENTS 11,040     1907    Great Britain.

FRED C. MATTERN, JR., *Primary Examiner.*

ARTHUR M. HORTON, SAMUEL BOYD, BENJAMIN A. BORCHELT, *Examiners.*

L. R. LYON, R. F. SHAHL, *Assistant Examiners.*